Patented Jan. 5, 1937

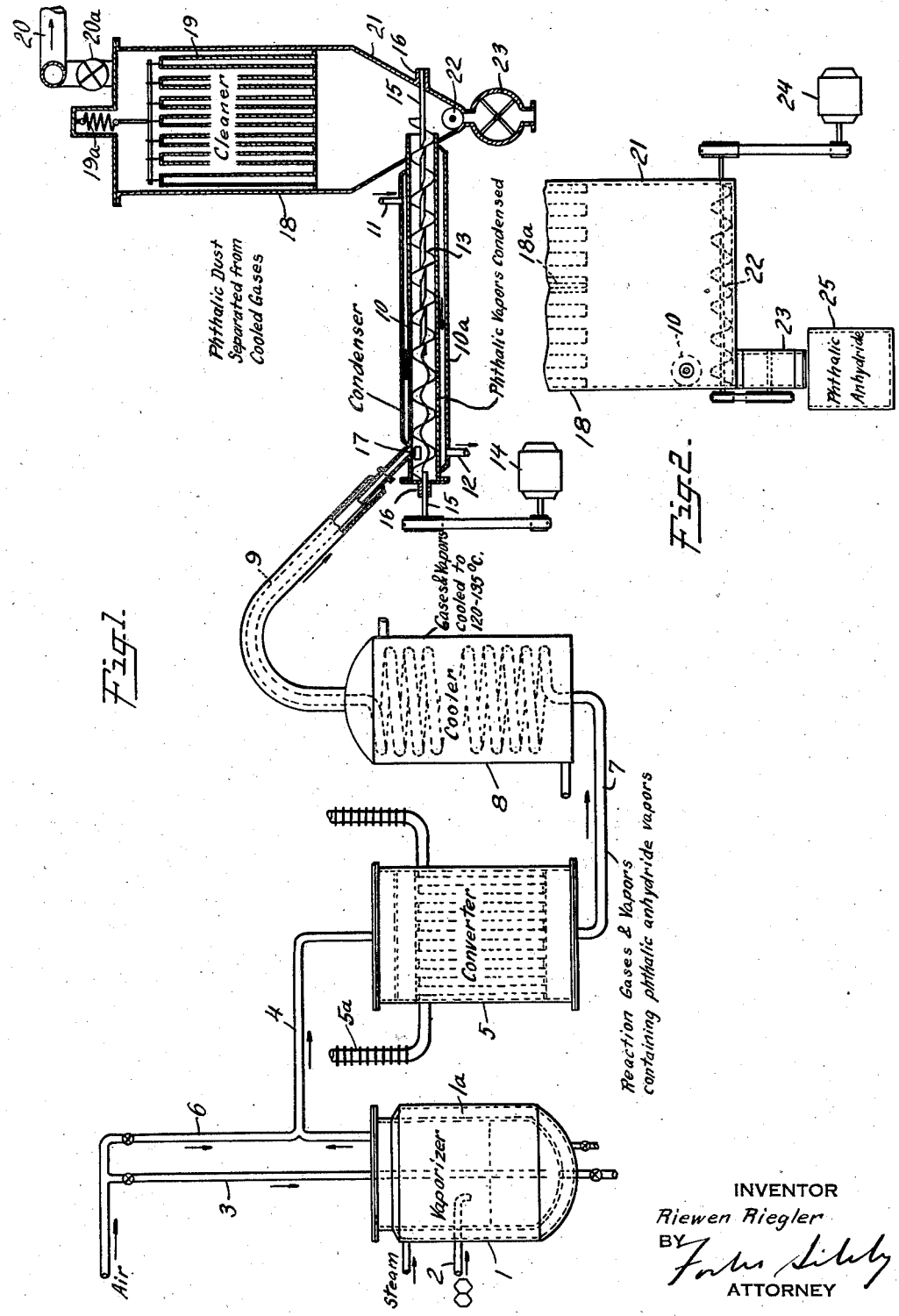

2,067,019

UNITED STATES PATENT OFFICE 2,067,019

PHTHALIC ANHYDRIDE RECOVERY

Riewen Riegler, Buffalo, N. Y., assignor to National Aniline and Chemical Company, New York, N. Y., a corporation of New York Application December 29, 1933, Serial No. 704,480

3 Claims. (Cl. 260—123)

This invention relates to the recovery of phthalic anhydride from gaseous and vaporous mixtures and especially to a method and apparatus for recovering it from a gaseous mixture resulting from the vapor phase oxidation of organic compounds.

In the manufacture of phthalic anhydride by the partial oxidation of organic compounds in accordance with one well-known method as generally practiced, vapors of naphthalene or a substituted naphthalene, e. g., methyl naphthalene, are mixed with air or another oxygen-containing gas and the mixture is passed through a catalytic converter and contacted therein with an oxidation catalyst under controlled reaction conditions. The resulting mixture of gases and vapors containing a relatively small amount of phthalic anhydride and by-product vapors is withdrawn from the converter at a temperature of about 350° to 550° C. and while yet at a temperature above the dew point of the phthalic anhydride, and therefore containing the phthalic anhydride in vapor phase, it is normally passed to large, spacious or room-like condensers for the condensation of the phthalic anhydride therefrom.

In order to obtain the desired removal or precipitation of phthalic anhydride from such a gas mixture, the condensation is normally effected in a large chamber or series of chambers, the walls of which are exposed to the outside atmosphere so that the heat of the reaction mixture is dissipated through these walls and solid phthalic anhydride is formed. Because of the relatively large cross-sectional area of the cooling chamber or chambers, the gases do not flow therethrough in a turbulent condition and hence the phthalic anhydride crystals which are formed settle out of the gas onto the walls and bottom of the chamber from which they are periodically manually withdrawn. It is a difficult problem to control the temperature of the condenser in such a manner as to effect efficient control of operations. The necessarily large size of the condensers, the inevitable fluctuation in the rate at which the mixture of gases and vapors enters the chamber and the seasonal and daily variations in atmospheric temperature all contribute to make it difficult to maintain the condenser at constant temperature.

The phthalic anhydride recovered by this known condensation method is in the form of long, needle-like crystals that are bulky and difficult to handle. Furthermore, the phthalic anhydride crystals thus obtained are not uniform in size, composition, or color. Since considerably different conditions of temperature and saturation prevail in various parts of the chamber, there being an especially great difference between the conditions of the gases immediately after entering and their condition just prior to leaving the chamber, the phthalic anhydride crystals recovered from various parts of the condenser vary in size and are contaminated non-uniformly with various impurities. In addition, the phthalic anhydride crystals adhere to the walls of the condensing chamber so that periodically it is necessary for workmen to enter the chamber and scale the crystals from the walls. As the vapors ordinarily present in the chamber are irritating to the skin and especially to the mucuous membranes, the process leads to disagreeable and unhealthful working conditions. The cooling chamber must be exceedingly large to operate satisfactorily and hence requires not only large quantities of materials for its construction but a large space for its placement.

An object of the present invention is to provide a process whereby phthalic anhydride may be recovered in a simple and efficient manner from the gaseous products of the catalytic oxidation of naphthalene and of other organic compounds while avoiding unhealthful and disagreeable working conditions.

A further object of the invention is to provide a process whereby phthalic anhydride may be directly produced in the form of finely divided particles and crystals of more uniform composition than obtainable by the aforementioned process.

A still further object of the invention is to eliminate the objectionable manual scaling process above described.

A yet further object is to reduce the amount of placement space necessary for condensers and to reduce the amount of materials necessary in their construction.

Further objects will be evident from the following description.—

In accordance with the present invention phthalic anhydride is precipitated and recovered from a vapor, for instance the mixture obtained by the vapor phase, catalytic, partial oxidation of naphthalene by air, by passing the vapor through an externally cooled condenser under definitely controlled conditions of temperature and having a gas passage of relatively small cross-section so that a condition of turbulent flow of gases passing therethrough is maintained. By arranging the condenser so that the gases pass therethrough in a condition of violent agitation or turbulence, a far greater effectiveness of cooling surface is attainable and hence much less cooling surface is necessary. An elongated tubular condenser provided with mechanically operated scraper of the screw conveyor type is especially suitable for this purpose.

By means of this improvement the vapors may be rapidly cooled and phthalic anhydride condensed without the necessity of providing the large condensing chamber or chambers formerly required. The mechanical scraper serves to keep the walls of the condenser clean and free from phthalic anhydride so that a maximum efficiency of heat transfer between the gases and the cooling wall is maintained. The scraper furthermore serves as a conveyor to impel the separated phthalic anhydride toward suitable collecting apparatus.

In the event the phthalic anhydride is condensed from a gaseous mixture such as that obtained by a catalytic oxidation process, the residual gases after the condensation will ordinarily contain phthalic anhydride in the form of fine dust. The gases containing this dust are passed through a cleaning device, such as a settling chamber or bag filter, for the purpose of removing the phthalic anhydride dust.

By the use of the present invention highly efficient cooling is obtained and a much shorter time is necessary to effect the phthalic anhydride condensation. The recovery apparatus, therefore, may be much smaller than the condensing chamber of the type previously described. Furthermore, with the smaller apparatus more uniform conditions of condensation prevail so that a product of greater uniformity is obtained by the condensation. In addition the separated product in its passage through the condenser is caused to become intimately mixed so that a very uniform product is finally obtained.

The condenser employed in the present process may be cooled by any suitable cooling fluid. Good results are obtained using a "water-jacketed" or "brine jacketed", tubular condenser. With this type of condenser a high rate of heat transfer is obtainable between the cooling fluid and the condenser wall and by using an efficient scraping device, for example a continuously operated helicoidal screw, heat transfer between the condenser wall and the hot vapors may be maintained at a high efficiency.

The condenser may be constructed of any suitable material of good heat conductivity that is not seriously corroded by the vapors being treated. Ordinary steel or stainless steel fulfills these requirements but any other suitable material may be employed.

In order that a better understanding of my invention may be had, the following description is set forth of a specific embodiment, which is illustrated in the accompanying drawing.—

Fig. 1 shows diagrammatically apparatus for the preparation of phthalic anhydride by the catalytic oxidation of naphthalene with air and embodies one form of condensation apparatus of the present invention;

Fig. 2 is a fragmentary elevation of the cleaner of Fig. 1 and indicates, also diagrammatically, the relation of condenser and cleaner in the described embodiment.

With especial reference to Fig. 1, the numeral 1 indicates a conventional naphthalene vaporizer having a naphthalene inlet 2 and air inlet 3. The vaporizer 1 may be provided with a steam jacket 1ª as shown. The vaporizer is connected by pipe 4 to the catalytic converter 5 which may be a converter of the ordinary type employed in the catalytic oxidation of naphthalene and may be provided with a temperature regulating jacket and coolers 5ª, as indicated. An auxiliary air inlet 6 is shown for regulating the ratio of air and naphthalene vapor passing to the converter. The catalytic converter 5 is connected by means of pipe 7 to a cooler 8, which in turn is connected by means of a jacketed (or lagged) pipe 9 to condenser 10.

The condenser 10, as shown, is provided with a cooling packet 10ª having an inlet 11 and outlet 12 for the passage of a cooling fluid therethrough. The condenser 10 is provided with a screw conveyor or scraper 13, which may be driven in any suitable manner, for example by an electric motor 14, which may be mounted at either end of the scraper. As shown in the drawing, the scraper 13 is helicoidal in form and defines a spiral path for gases passing through the condenser; it is provided with a central supporting shaft 15. At the end of the condenser adjacent the gas inlet pipe 9, the scraper has no central shaft, thereby permitting direct longitudinal as well as spiral flow of gases through the condenser in this vicinity. This design also provides more easy access to the interior of the condenser for cleaning at this end. The shaft 15, which carries scraper 13, is suitably mounted in bushings 16. A removable or transparent panel 17 may provide an observation port for inspection of the condenser interior. As previously noted, the condenser may be constructed of any suitable material, and steel or stainless steel, because of their good heat conductivity and because they are relatively little affected by erosion and by the corrosive action of the gases, are especially suitable. The size of the condenser will depend upon the volume of gas to be treated but, as illustrative, a condenser having an inner diameter of a foot and a length of 20 feet may be effective with suitable regulation of cooling fluid, say water entering at about 0° to 10° C., for the condensation of phthalic anhydride from the gases resulting from the catalytic oxidation of 100 pounds naphthalene per hour. The condenser 10 is shown in the drawing arranged horizontally. It may, however, be arranged either in an inclined or vertical position and in such case it is desirable that the flow of gas and phthalic anhydride be generally downward rather than upward through the condenser. The end of the condenser 10, remote from the gas inlet, conducts immediately into a dust separator 18.

The separator 18 is shown as a bag filter provided with bags 19 and suitable bag shaking mechanisms 19ª. The separator 18 is preferably separated by means of a baffle 18ª into two chambers each connected with pipe 20 through a valve 20ª. The bag shaking mechanisms 19ª are so arranged that the bags of each section or chamber of the apparatus are shaken alternately, the valves 20ª being controlled so that the gases are passed through that section which is not being shaken. Conduit 20 leads to a blower and vents to the atmosphere or to scrubbing apparatus. The lower portion 21 of separator 18 is hopper-shaped and is provided with a screw conveyor 22, more clearly shown in Fig. 2. At one end of this hopper there is provided a rotary valve 23 for withdrawing solid products from the hopper without removal of gases. In Fig. 2 the condenser 10 is indicated as positioned at the same end of the hopper as the rotary valve 23. It may, of course, be positioned wherever desired since phthalic anhydride admitted from the condenser will be conveyed together with that separated in the bag filter 18, by means of screw conveyor 22 to the removal end of the hopper. Conveyor 22 may be continuously or intermittently operated, as by a motor 24. A container 25 for collecting phthalic anhydride is placed beneath discharge valve 23.

Suitable heating jackets and/or lagging (not shown) are provided to maintain necessary temperature in the various pieces of apparatus, piping, etc., and/or to reduce loss of heat, as is customary in the art.

The operation of the apparatus is as follows:

Naphthalene and air are supplied to vaporizer 1 by means of inlets 2 and 3, the naphthalene being maintained in molten condition and the air being bubbled up therethrough to carry off naphthalene vapors. The resultant gas and vapor mixture is withdrawn and passed by means of pipe 4 to the catalytic converter 5; auxiliary air may be introduced through pipe 6, if desired, the air and naphthalene entering the converter being regulated to a ratio of 25 to 35 parts by weight of air to each part by weight of naphthalene.

In the catalytic converter the elevated temperature is maintained by the heat of the reaction, a cooling fluid being provided around the tubes of the converter to prevent excessive rise of temperature therein. This cooling fluid may maintain the proper temperature in known manner,— for example a liquid that boils at the required temperature may be used, and maintained at the boiling point by means of the hot reaction mixture within the converter and the coolers 5a, which condense the vapors of the cooling liquid and return the condensate. Ordinarily the gases will leave the converter at a temperature of around 450° C.

Products of the reaction pass from the converter 5 by means of pipe 7 into cooler 8 where the temperature is reduced to around 120° to 135° C.,— that is, to a temperature slightly above the dew point of phthalic anhydride in the gas mixture.

The cooled gases and vapors pass by means of a pipe 9 into the condenser 10, entering the condenser while still slightly above the dew point of phthalic anhydride. A cooling fluid, for example cold water or brine at say 0–10° C., is passed through inlet 11 into the jacket 10a of condenser 10 and is withdrawn at outlet 12. The walls of the condenser are thus maintained at a temperature well below the melting point of phthalic anhydride. By the passage of the gas mixture into contact with the cooled walls of the condenser, phthalic anhydride is caused to separate out in the form of fine crystals. Motor 14 is operated to drive the scraper 13 so that crystals separating out on the walls of the condenser will be scraped therefrom and so that the phthalic anhydride which collects at the bottom of the condenser is impelled, in a generally concurrent direction with respect to gas flow, toward the outlet end of the condenser, whence it passes into the hopper of cleaner 18.

In order to avoid clogging of the conveyor with phthalic anhydride at that portion of the condenser immediately surrounding the gas inlet, where the gases are brought into contact with the scraper before cooling has become effective, the shaft is omitted from this portion of the conveyor so as to avoid obstruction of the gas passage. Satisfactory operation is obtained with a condenser having the shaft omitted from only the first two or three conveyor flights.

The gases are cooled in the condenser 10 to a temperature of about 30° to 40° C. and at this temperature are relatively free from phthalic anhydride in vapor form. They yet contain 15% to 25% of their original phthalic anhydride content, however, in the form of a more or less fine dust, which because of its fineness, does not settle out in the condenser. The gases containing the phthalic anhydride dust are passed up through the bag filter 18 passing alternately through each section. Ordinarily the capacity of the bag-filter will be sufficient so that the gases may pass through it in a non-turbulent condition. In this manner the phthalic anhydride dust is filtered from the gases; the gases are expelled through outlet 20. During the passage of the gases through the filter bags 19 of each section of separator 18, the bags of the other section are shaken by shaking mechanism 19a causing separated phthalic anhydride to fall into the hopper 21. At the bottom of this hopper screw conveyor 22 is operated in any suitable manner to impel the separated dust toward the rotating valve 23. The dust collected by the bag filter 18 and the fine, crystalline powder collected in the condenser 10, pass together towards the outlet valve 23; the valve may be operated in any suitable manner, for example by the same drive means as conveyor 22, to permit passage of the phthalic anhydride to a container 24 without the escape of gas. It will be obvious that, if desired, the finer dust recovered from the filter may be collected apart from the powder obtained in the condenser.

I claim:

1. The method of cooling phthalic anhydride vapors and preparing phthalic anhydride in the form of a solid, crystalline product, which comprises passing phthalic anhydride vapors into a screw conveyor the walls of which are maintained at a temperature substantially below the condensation temperature of phthalic anhydride and adjusting the rate of flow of vapors so that the vapors are maintained in a state of turbulence as they contact with the cooled walls of the conveyor, and operating the screw conveyor so as to continuously scrape resultant crystallized phthalic anhydride from said walls.

2. In the preparation of phthalic anhydride by the catalytic oxidation of naphthalene, the steps which comprise cooling the hot reaction gases and vapors to a temperature slightly above the dew point of phthalic anhydride, passing the reaction gases and vapors at a temperature slightly above the dew point of phthalic anhydride into a tubular condenser and through the condenser as a turbulent stream so as to provide violent agitation of the gases and vapors in contact with the cooled portions of said tubular condenser and condense phthalic anhydride in the form of solid crystals, withdrawing the cooled gases containing phthalic anhydride dust from the condenser and reducing their velocity, and subjecting the gases in non-turbulent condition to a cleaning treatment for the removal of the phthalic anhydride dust.

3. In the preparation of phthalic anhydride in vapor phase by the catalytic oxidation of naphthalene, the improvement which comprises passing the hot reaction gases containing phthalic anhydride vapor in a spiral path defined by a cold surface maintained at a temperature substantially below the condensation temperature of phthalic anhydride and a hot surface maintained at substantially the temperature of the gases, and causing relative movement of the hot and cold surfaces so as to scrape condensed phthalic anhydride from the cold surfaces.

RIEWEN RIEGLER.